(12) United States Patent
Zhao et al.

(10) Patent No.: US 11,139,689 B2
(45) Date of Patent: Oct. 5, 2021

(54) POWER TRANSMITTING ANTENNA AND POWER TRANSMITTING DEVICE APPLYING THE SAME

(71) Applicant: Silergy Semiconductor Technology (Hangzhou) LTD, Hangzhou (CN)

(72) Inventors: Chen Zhao, Hangzhou (CN); Tong Sun, Hangzhou (CN); Wang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 245 days.

(21) Appl. No.: 15/673,584

(22) Filed: Aug. 10, 2017

(65) Prior Publication Data
US 2018/0062446 A1 Mar. 1, 2018

(30) Foreign Application Priority Data
Aug. 31, 2016 (CN) .......................... 201621033800.4

(51) Int. Cl.
| | |
|---|---|
| H02J 50/12 | (2016.01) |
| H01F 27/28 | (2006.01) |
| H01Q 21/29 | (2006.01) |
| H01F 27/00 | (2006.01) |
| H01F 5/02 | (2006.01) |
| H01F 27/32 | (2006.01) |
| H01F 38/14 | (2006.01) |
| H01Q 1/24 | (2006.01) |
| H01Q 1/38 | (2006.01) |
| H01Q 7/00 | (2006.01) |

(52) U.S. Cl.
CPC ................ *H02J 50/12* (2016.02); *H01F 5/02* (2013.01); *H01F 27/006* (2013.01); *H01F 27/2823* (2013.01); *H01F 27/325* (2013.01); *H01F 38/14* (2013.01); *H01Q 1/248* (2013.01); *H01Q 1/38* (2013.01); *H01Q 7/00* (2013.01); *H01Q 21/29* (2013.01); *H01F 2005/027* (2013.01)

(58) Field of Classification Search
CPC .. H01F 27/006; H01F 27/2823; H01F 27/325; H01F 38/14; H01F 5/02; H01F 2005/027; H01Q 1/248; H01Q 1/38; H01Q 21/29; H01Q 7/00; H02J 50/12
See application file for complete search history.

(56) References Cited

U.S. PATENT DOCUMENTS

| | | | |
|---|---|---|---|
| 9,692,238 B2 | 6/2017 | Matsumoto et al. | |
| 2003/0062980 A1* | 4/2003 | Scheible | ................ H02J 50/40 336/170 |
| 2012/0025624 A1 | 2/2012 | Lee et al. | |

(Continued)

*Primary Examiner* — Rexford N Barnie
*Assistant Examiner* — Elim Ortiz
(74) *Attorney, Agent, or Firm* — Michael C. Stephens, Jr.

(57) ABSTRACT

A power transmitting device for a contactless power supply, can include: a power transmitting antenna having a plurality of transmitting coils; where each of the plurality of transmitting coils comprises a coil turn or a plurality of concentric coil turns with a substantially coplanar setting and having a coil surface; where an axis of each of the plurality of transmitting coils is axially perpendicular to the power transmitting antenna; and where the axis of each of the plurality of transmitting coils forms a predetermined angle with respect to each other.

10 Claims, 8 Drawing Sheets

(56) References Cited

U.S. PATENT DOCUMENTS

2013/0320773 A1* 12/2013 Schatz .................... H02J 50/12
            307/104
2017/0110242 A1    4/2017 Kanno
2017/0135187 A1    5/2017 Zhang et al.
2017/0229901 A1*  8/2017 Elliott ...................... H02J 7/34
2018/0331574 A1* 11/2018 Seo ......................... H02J 50/70

* cited by examiner

POWER TRANSMITTING ANTENNA AND POWER TRANSMITTING DEVICE APPLYING THE SAME

RELATED APPLICATIONS

This application claims the benefit of Chinese Patent Application No. 201621033800.4, filed on Aug. 31, 2016, which is incorporated herein by reference in its entirety.

FIELD OF THE INVENTION

The present invention generally relates to the field of power electronics, and more particularly to power transmitting antennas and devices.

BACKGROUND

Contactless power supply techniques are becoming widely used in electronic products, such as mobile phones, MP3 players, digital cameras, laptops, and so on. In one resonance-type contactless power supply approach, a coupling circuit can include a power transmitting antenna and a power receiving antenna. The power transmitting antenna and other components in a power transmitter may form a transmitter-side resonant circuit, and the power receiving antenna and other components in a power receiver may form a receiver-side resonant circuit. Electric energy can be transferred in a contactless manner when the transmitter-side resonant circuit and the receiver-side resonant circuit have the same resonance frequency. The receiver-side resonant circuit can be coupled to the transmitter-side resonant circuit via electromagnetic field, and may thus resonate when the transmitter-side resonant circuit resonates.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
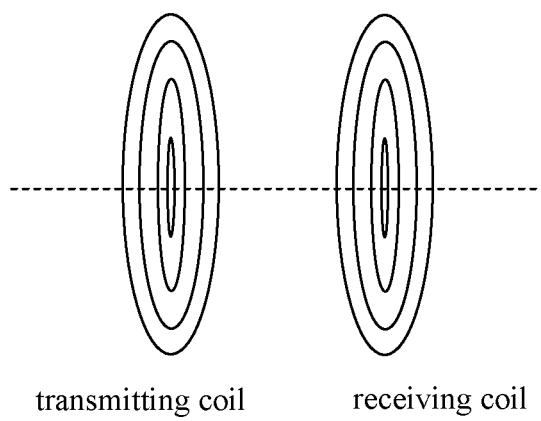
FIG. 1 is a diagram of an example power transmitting antenna and a power receiving antenna for a contactless power supply device.

Referring now to FIG. 1, shown is a diagram of an example power transmitting antenna and a power receiving antenna for a contactless power supply device. This example of a resonance-type contactless power supply device can include a resonant and magnetic coupling circuit having a power transmitting antenna and a power receiving antenna. The power supply device can also include a transmitting-side resonant circuit having the power transmitting antenna and other modules of the power transmitter, and a receiving-side resonant circuit having the power receiving antenna and other modules of the power receiver. The resonance frequencies of the transmitting-side resonant circuit and the receiving-side resonant circuit can be set to be the same, such that the receiving-side resonant circuit coupled to the transmitting-side resonant circuit through the electromagnetic field also resonates when the transmitting-side resonant circuit resonates. In this way, power can be transmitted in a contactless manner.

A better coupling degree may be provided by aligning the power receiving antenna with the power transmitting antenna in the contactless power supply (e.g., the coil of the power receiving antenna is coaxial with the coil of the power transmitting antenna), thereby improving the efficiency of the wireless power transmission. In this example, the power transmitting antenna can be arranged in a planar manner. However, placement of the power receiver carrying the power receiving antenna may have restrictions due to the need for alignment, which can result in a relatively poor user experience. In some other approaches, although the positional degree of freedom of the power receiver may be improved by setting a plurality of overlapped transmitting coils on the plane to form the power transmitting antenna, the improvement of the positional degree of freedom of the power receiver may still be somewhat limited.

In one embodiment, a power transmitting device for a contactless power supply, can include: (i) a power transmitting antenna having a plurality of transmitting coils; (ii) where each of the plurality of transmitting coils comprises a coil turn or a plurality of concentric coil turns with a substantially coplanar setting and having a coil surface; (iii) where an axis of each of the plurality of transmitting coils is axially perpendicular to the power transmitting antenna; and (iv) where the axis of each of the plurality of transmitting coils forms a predetermined angle with respect to each other.

Figure 2A:
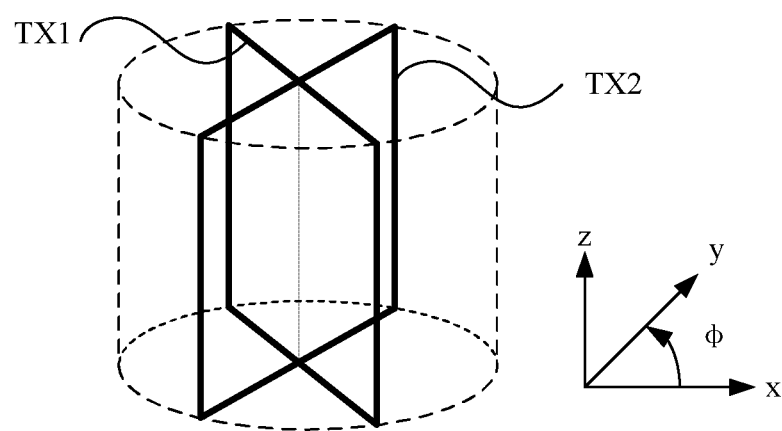
FIG. 2A is a stereogram diagram of an example power transmitting antenna, in accordance embodiments of the present invention.
Figure 2B:
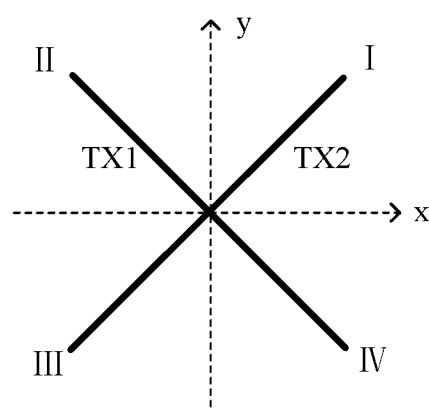
FIG. 2B is a top view of an example power transmitting antenna, in accordance embodiments of the present invention.

Referring now to FIGS. 2A and 2B, shown are stereogram diagrams of an example power transmitting antenna, in accordance embodiments of the present invention. In the example of FIG. 2A, the power transmitting antenna can include transmitting coil TX1 and transmitting coil TX2. For example, transmitting coils TX1 and TX2 can include a coil turn or a plurality of concentric coil turns with a substantially coplanar setting, and with a substantially planar coil surface. The axes of the coil turns can be perpendicular to the coil surfaces. The axes of each of the transmitting coils may be axially perpendicular to the electrical energy transmitting antenna, and the axes of all transmitting coils may form a predetermined angle with respect to each other.

For example, the coil surfaces of transmitting coils TX1 and TX2 are perpendicular to each other as shown in FIG. 2B. That is, the axes of the transmitting coils can be perpendicular to each other. In addition, the coil surfaces of transmitting coils TX1 and TX2 can be set at a predetermined angle with respect to each other, and the two coil surfaces can intersect at the axis of the cylinder defined by the two coil surfaces. That is, the axis of the power transmitting antenna can pass through the coil surfaces of all of the transmitting coils. A power transmission a may be described using a column coordinate system. The column coordinate system usually locates points in the space by x-axis coordinates, z-axis coordinates, and circumferential deflection angle $\varphi$. In the description herein, the z-axis is defined as the axial direction of the power transmitting antenna, and the direction around the axis z. That is, the direction of the circumferential deflection angle $\varphi$ may be defined as the circumferential direction. In the power transmitting antenna example shown in FIGS. 2A and 2B, the position of transmitting coil TX2 can be obtained by rotating transmitting coil TX1 by a predetermined angle along the circumferential direction with respect to the axis of the power transmitting antenna.

Figure 2C:
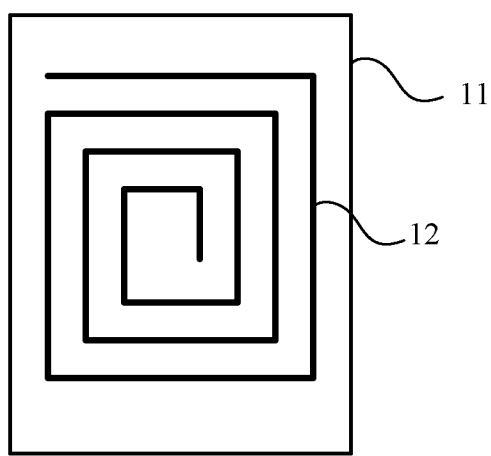
FIG. 2C is a schematic diagram of an example transmitting coil, in accordance embodiments of the present invention.

Referring now to FIG. 2C, shown is a schematic diagram of an example transmitting coil, in accordance embodiments of the present invention. In this particular example, each of the transmitting coils can include coil carrier 11 and conducting wire 12. Coil carrier 11 may have a relatively small thickness, and can be used to define a plane of the coil surface 13. Conducting wire 12 can be formed on coil surface 13, and may extend on coil surface 13, or be wound around the side of coil carrier 11 in the thickness direction, in order to form a coil turn or a plurality of concentric coil turns with a substantially coplanar setting. A current may flow along the coil turn when conducting wire 12 is powered, in order to couple to the power receiving antenna by generating a corresponding magnetic field, and to accordingly transmit power. For example, coil carrier 11 can be implemented as a circuit board, and conducting wire 12 may be formed on the main plane of the circuit board. Alternatively, coil carrier 11 can also be implemented as a bobbin, and conducting wire 12 can be wound along the side of coil carrier 11.

In this particular example, the size and shape of the transmitting coil can be predetermined according to the design requirements, and may not be limited to a specific shape and/or size. In addition, transmitting coils TX1 and TX2 do not have to be identical in certain embodiments. Those skilled in the art will recognize that, when the coil is powered, the magnetic field strength may be maximized in the direction that is perpendicular to the plane of the coil turns of the coil, and the magnetic field strength can be minimized in the direction that is parallel to the coil turns. In order to achieve better power transmitting efficiency in a contactless power supply, the two transmitting coils can be predetermined in different directions such that improve magnetic field coverage can be obtained in different directions around the axial direction. In a contactless power supply, the transmitting effect of transmitting coils TX1 and TX2 and the coupling degree of the power receiver can be respectively detected by associated control devices, in order to select one of them for power transmitting to realize an improved power transmitting effect.

Figure 3:
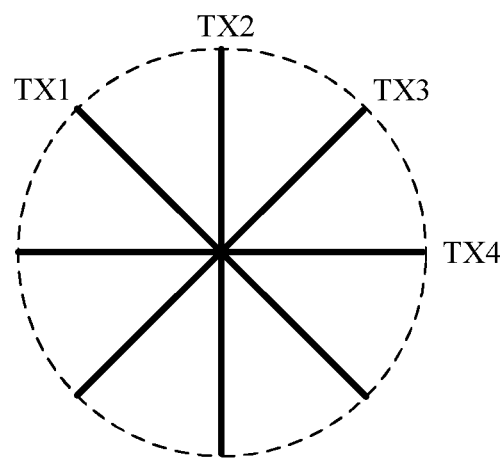
FIG. 3 is a top view of an example transmitting coil, in accordance embodiments of the present invention.

Referring now to FIG. 3, shown is a top view of an example transmitting coil, in accordance embodiments of the present invention. In this particular example, four transmitting coils TX1-TX4 can be included. For example, the angles between the coil surfaces of every two transmitting coils can be equal. In this example, the angle between the coil surfaces or the axes of the adjacent transmitting coils is 45°. The angle between the coil surfaces or the axes of the adjacent transmitting coils can be 180/N, where the number of the transmitting coils is N. Thus, the coil surfaces of all transmitting coils may form a predetermined angle with respect to each other. That is, the axes of the transmitting coils may form a predetermined angle with respect to each other. The angle between the axis of each transmitting coil and the adjacent transmitting coil can also be different. Therefore, an improved electromagnetic coupling may be formed between a transmitting coil and a receiving coil of the power receiving antenna, which can be located in the different directions of the cylinder as shown, in order to improve the power transmitting efficiency. In addition, the shape of each transmitting coil can be the same or different.

Figure 4:
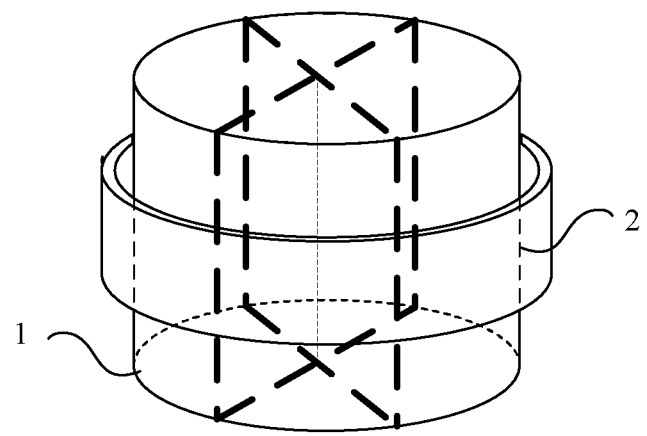
FIG. 4 is a diagram of an example positional relationship of a power transmitting antenna and a power receiving antenna coupled with each other, in accordance embodiments of the present invention.
Figure 5:
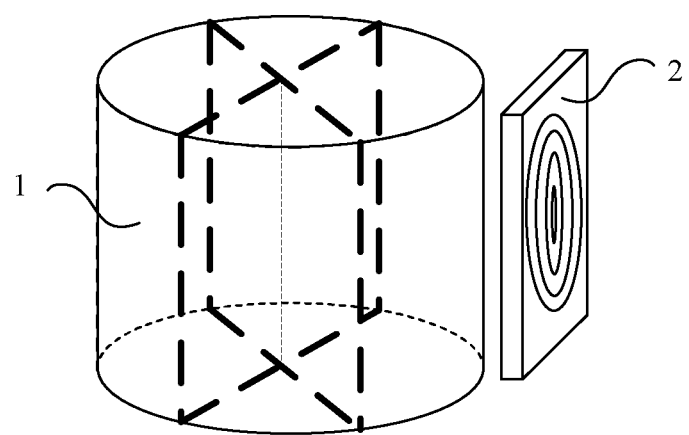
FIG. 5 is a diagram of an example positional relationship of a power transmitting antenna and a power receiving antenna of another type coupled with each other, in accordance embodiments of the present invention.

Referring now to FIGS. 4 and 5, shown are diagrams of example positional relationships of a power transmitting antenna and a power receiving antenna coupled with each other, in accordance embodiments of the present invention. In FIG. 4, since power transmitting antenna 1 is formed in a cylindrical shape, power receiving antenna 2 at the power receiver can be formed in a cyclic shape, or a portion of a cyclic shape. Because power transmitting antenna 1 may have a plurality of coils in different directions, a transmitting coil having a higher degree of coupling and transmitting efficiency can be provided. Therefore, no matter how power receiving antenna 2 rotates around power transmitting antenna 1, improved power receiving can occur, as compared to other approaches.

In FIG. 5, the power receiving antenna of the power receiver may also not be jacketed, but can instead be placed opposite to a portion of the side surface of the power transmitting antenna. Similarly, because power transmitting antenna 1 has a plurality of coils in different directions in this example, a transmitting coil having a higher degree of coupling and transmitting efficiency may be provided. Thus, no matter how power receiving antenna 2 rotates around power transmitting antenna 1, improved power receiving can occur, as compared to other approaches.

Figure 6:
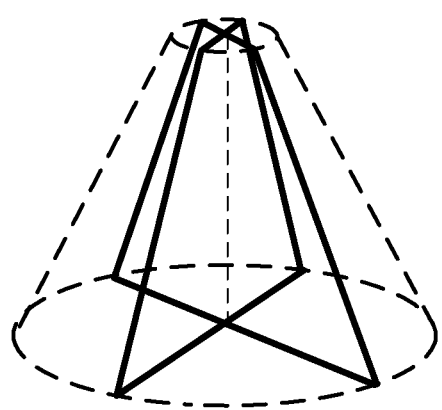
FIG. 6 is a stereogram diagram of an example power transmitting antenna, in accordance embodiments of the present invention.

Referring now to FIG. 6, shown is a stereogram diagram of an example power transmitting antenna, in accordance embodiments of the present invention. Those skilled in the art will recognize that the shape of the power transmitting antenna, that is, the shape surrounded by the coil surfaces of all the transmitting coils, can be cylindrical as shown in FIGS. 2A-2B, or any other shapes having an axial direction and a side surrounding the axial direction. One example of the latter is a frustum shape in FIG. 6, and other examples include a prism, a cuboid, a pyramid, and a column or cone having an irregular axial sectional shape.

In certain embodiments, the axes of the plurality of transmitting coils can be set to be respectively directed in different directions. Therefore, transmitting coils with higher transmitting efficiency can occur in the different directions surrounding the power transmitting antenna, and improved energy transmitting may be achieved by selecting one or more transmitting coil with the best efficiency. In this way, the degree of freedom of the power receiver in the power transmitting can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power transmitting device for a contactless power supply, the power transmitting device comprising:
    a) a power transmitting antenna having a plurality of transmitting coils, wherein an angle between an axis of each of said transmitting coils and an axis of an adjacent transmitting coil is 180/N, wherein N is the number of said plurality of transmitting coils in said power transmitting antenna;
    b) wherein each of said plurality of transmitting coils comprises a plurality of concentric coil turns with a substantially coplanar setting to form a coil surface;
    c) wherein all of said coil surfaces intersect at an axis of a cylinder that is defined by all of said coil surfaces;
    d) wherein said axis of each of said plurality of transmitting coils is axially perpendicular to said power transmitting antenna; and
    e) wherein a position of each of said plurality of transmitting coils is respectively obtained by rotating a predetermined angle in one circumferential direction with reference to said axis of said transmitting antenna.

2. The power transmitting device of claim 1, wherein planes in which said plurality of transmitting coils are located intersect at said axis of said power transmitting antenna.

3. The power transmitting device of claim 1, wherein each of said plurality of transmitting coils comprises:
    a) a coil carrier that defines said coil surface; and
    b) a conducting wire formed on said coil surface defined by said coil carrier.

4. The power transmitting device of claim 3, wherein said coil carrier comprises a flexible circuit board.

5. The power transmitting device of claim 3, wherein said coil carrier comprises a bobbin.

6. The power transmitting device of claim 1, wherein each of said transmitting coil comprises:
    a) a coil carrier for defining said coil surface; and
    b) a conducting wire formed on said coil surface wound on said coil carrier.

7. The power transmitting device of claim 6, wherein said coil carrier comprises a flexible circuit board.

8. The power transmitting device of claim 6, wherein said coil carrier comprises a bobbin.

9. An apparatus, comprising said power transmitting device of claim 1, and further comprising a power receiving antenna having a cyclic shape and being configured to encircle at least a portion of said plurality of transmitting coils.

10. The power transmitting device of claim 1, wherein said power transmitting antenna is formed in a cylindrical shape.

* * * * *